United States Patent Office 3,428,474
Patented Feb. 18, 1969

3,428,474
METHOD FOR FORMING CERAMIC METALLIC BONDS

Joseph R. Hensler, Rochester, and Eugene C. Letter, Penfield, N.Y., assignors to Bausch & Lomb Incorporated, Rochester, N.Y., a corporation of New York No Drawing. Filed June 24, 1964, Ser. No. 377,500
U.S. Cl. 117—47 3 Claims
Int. Cl. C23c *13/04*

ABSTRACT OF THE DISCLOSURE

An improved method for forming a ceramic metallic bond of the type wherein the ceramic article to be coated is first coated with a vacuum deposited coating of the alloy and the alloy in turn in provided with a vacuum deposited layer of solder.

The present invention relates to a method for bonding a metal layer to a ceramic article and more particularly to a method for producing a flux free solder bond between a sintered ceramic article and a metal layer.

An increased interest in ultrasonic delay lines has stimulated various endeavors to produce an improved flux free bond between like or different materials. For example, the U.S. patent of Marafioti 2,964,839 shows one approach wherein a delay medium such as silica is bonded to a quartz transducer which in turn has a tin lead electrode bonded thereto. The bond between the fused silica and the crystal may comprise indium diffused through a gold platinum alloy film on the crystal and indium diffused through a platinum film on the silica.

Advantageously, the bonds produced by the novel methods disclosed herein are less complex than those disclosed in the prior art. Additionally, it appears that the novel method of bonding disclosed herein will be applicable for a wide range of products wherein flux free solder bonds are desirable. There are for example cost savings which may be attributed to the use of relatively inexpensive materials with the novel methods which are disclosed and claimed herein. Furthermore, the methods according to the present invention produce satisfactory bonds and yet do not require any extraordinary skill. Accordingly, additional cost savings may be obtainable by using relatively non-skilled personnel for bonding operations. It is also apparent that the novel methods according to the invention are readily adaptable to large scale manufacturing operations.

Briefly, the methods for forming a flux free bond between a ceramic article and a metal coating comprises the following steps. The surface of the ceramic article is cleaned and the article placed in a high vacuum chamber. Multiple sources i.e. a plurality of heaters for evaporating materials are also disposed in the chamber at a suitable distance from the cleaned ceramic surface. The cleaned ceramic surface is so arranged that material evaporated by the source will be deposited on or condensed on the ceramic surface. A quantity of nickel alloy is placed on a tungsten filament or on a suitable source and a quantity of solder is disposed in or on a second source or boat preferably of tungsten or molybdenum.

The pressure in the chamber is reduced to about 1 to 2 times $10^{-5}$ millimeters of mercury. A portion of the nickel alloy is deposited onto the ceramic surface. After a sufficient amount of nickel is deposited onto the surface the second source is heated and a film of solder is evaporated onto the nickel coating. The solder coating is continued until a relatively thick layer is obtained. After a suitable thickness has been obtained the vacuum is broken. An electrode or other article may then be soldered to the resulting article by conventional techniques.

Improved results have been obtained according to a preferred embodiment of this invention. According to that embodiment the solder is evaporated onto the substrate in a liquid form. For example, the temperature and pressure conditions are maintained so that the solder is deposited onto the substrate in the liquid phase instead of allowing the material to change from the vapor phase directly into the solid phase. In order to obtain optimum results it was found necessary to maintain the substrate at an elevated temperature during the evaporation of the solder. For example, the substrate should be maintained at a temperature of between the melting point of the solder to 10° F. above that temperature at which the solder melts.

The present invention will be described in more detail in connection with an application for ultrasonic delay lines. For example, the ceramic material referred to may be a transducer material such as a barium titanate. The transducer comprises a "hot pressed" or sintered pulverulent material which forms a cohesive mass. The hot pressed article is then "lapped" according to conventional techniques to form a finely ground or polished surface.

The lapped surface of the barium titanate article is cleaned with deionized water, isopropyl alcohol, and subjected to a vapor of isopropyl alcohol. In some cases it is also desirable to clean the surface with a mild detergent or other cleaning agents prior to washing with deionized water. The cleaning steps may also include a degassing operation which comprises maintaining the article at a reduced pressure i.e. in a vacuum chamber, for approximately 30 minutes at a pressure of about 2 times $10^{-4}$ mm. of mercury or less. The degassing step is presently thought to be relatively important for bonding to barium titanate compacts however, would be relatively unimportant for a glass article.

Additional cleaning is accomplished by subjecting the article to a glow discharge for approximately 30 minutes. A pressure of about 2–20 microns of mercury is maintained during the glow discharge. The preferred conditions for the glow discharge are about 50 milliamps and 3000 volts. During the glow discharge the temperature of the article should be maintained at a temperature which is below 239° F. More details pertaining to the cleaning steps are set forth in Chapter 5 of the text "The Properties of Glass Surfaces" by L. Holland, Chapman & Hall, 1964.

A plurality of sources i.e. electric heaters are also disposed in the vacuum chamber and are adapted to evaporate materials placed thereon when a current is passed through the source. According to the preferred embodiment of the invention, about 1½ grams of an iron nickel cobalt alloy such as "Inconel" is placed on a first source and about 2.5 grams of solder is placed on the second source.

The "lapped" and cleaned surface of the ceramic article is disposed in the vacuum chamber at a distance of about 9–12 inches from the sources and adapted to condense any metal which strikes the surface upon evaporation. The pressure in the chambers is reduced to about 1–2 times $10^{-5}$ mm. of Hg. A pressure of 1 to 2 times $10^{-4}$ has been found to be satisfactory for evaporation purposes, however, the adhesion between the metal film and the ceramic article is improved by using the higher vacuum.

Electric current is passed through the first source to heat the source and the Inconel. The Inconel is heated until approximately ½ of the "Inconel" has been evaporated. Preferably, the deposition of the Inconel is accomplished in about 15 minutes. The solder is then heated by passing electric current through the second source and the solder evaporated or deposited onto the Inconel surface. Usually, the second evaporation takes place immediately after the first evaporation so that there is relatively little chance for oxidation to occur. In some cases it has been found advantageous to start the solder evaporation before completing the evaporation of the nickel alloy. In other cases an inert gas is allowed to enter the chamber in order to minimize any oxidation.

According to the preferred method, the solder is evaporated onto the Inconel surface in the liquid phase. This approach has been found to produce substantially improved results. In order to obtain the optimum results the substrate is maintained at an elevated temperature without a relatively critical range during the evaporation of the solder. For example, the substrate should be maintained at a temperature which is between the melting point of the solder and 10° F. above the melting point of the solder.

The solder should comprise a low melting alloy which has a melting point of about 204° F. One such solder has a composition of approximately 52.5% bismuth, 32% lead and 15.5% tin. Suitable eutectic mixtures are shown in the "International Critical Tables," vol. II McGraw Hill 1927 and are defined by the ternary phase diagram on page 418.

In practicing the invention the solder is heated until most of the solder has been evaporated. This produces a relatively thick solder layer on the surface of the article. After the relatively thick layer has been built up the vacuum is broken and the article removed from the chamber. A similarly treated glass element may then be soldered to a coated transducer by placing the transducer on the coated glass with a slight pressure and heating to thereby solder the two elements together.

While the invention has been described with reference to a specified example, it should be understood that it may be modified or embodied in other forms without departing from the scope of the appended claims.

What is claimed is:

1. A method for forming a ceramic metallic bond comprising the steps of providing a ceramic article, fine finishing at least one surface of said ceramic article, cleaning the finished surface of said article, placing the ceramic article in a vacuum chamber and evacuating the chamber to a pressure of no greater than $1 \times 10^{-4}$ millimeters of mercury, depositing a film of an iron nickel cobalt alloy onto the clean surface by heating the iron nickel cobalt alloy at the reduced pressure subsequently depositing a film of solder onto the alloy film by maintaing the pressure in the vacuum chamber at about 1 to $2 \times 10^{-5}$ millimeters of mercury and maintaining the temperature of the coated ceramic substrate within the range of between the melting point of the solder and 10° F. above said melting point, whereby an article may be readily soldered to the solder layer.

2. A method for forming a ceramic metallic bond according to claim 1 in which the cleaning step includes washing the surface with isopropyl alcohol, subjecting the washed surface to a reduced pressure of about 1 times $10^{-4}$ millimeters of mercury for about 30 minutes and subjecting the surface to a glow discharge of about 3000 volts and 50 milliamps at a pressure of between 2 to 20 microns of mercury.

3. A method for forming a ceramic metallic bond according to claim 2 in which the nickel evaporation and solder evaporation steps are overlapped.

References Cited

UNITED STATES PATENTS

| | | | |
|---|---|---|---|
| 2,384,578 | 9/1945 | Turner | 117—107 X |
| 2,586,752 | 2/1952 | Weber et al. | 117—107 X |
| 2,799,600 | 7/1957 | Scott | 117—217 X |
| 3,102,828 | 9/1963 | Couvoisier | 117—107 X |
| 3,253,331 | 5/1966 | Limansky | 117—107 X |
| 2,953,484 | 9/1960 | Tellkamp | 117—107 |
| 3,192,064 | 6/1965 | Certch et al. | 117—107 X |

OTHER REFERENCES

Holland: Vacuum Deposition of Thin Films, John Wiley & Sons, pp. 74 to 78, 80 to 83 relied upon, 1956.

Holland: The Properties of Glass Surfaces, John Wiley & Sons, 1964 pp. 307, 325 to 328 relied upon.

ALFRED L. LEAVITT, *Primary Examiner.*

A. GOLIAN, *Assistant Examiner.*

U.S. Cl. X.R.

117—71, 93.1, 107, 217